United States Patent
Mani Nadar (10) Patent No.: US 10,599,426 B2
(45) Date of Patent: Mar. 24, 2020

(54) AUTOMATED VALIDATION TOOL

(71) Applicant: Bank of America Corporation, Charlotte, NC (US)

(72) Inventor: Guru Mani Nadar, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/911,727

(22) Filed: Mar. 5, 2018

(65) Prior Publication Data

US 2019/0272168 A1 Sep. 5, 2019

(51) Int. Cl.
*G06F 11/36* (2006.01)
*G06F 8/71* (2018.01)
*G06F 17/22* (2006.01)

(52) U.S. Cl.
CPC ............ *G06F 8/71* (2013.01); *G06F 11/3672* (2013.01); *G06F 11/3688* (2013.01); *G06F 17/2235* (2013.01); *G06F 17/2247* (2013.01)

(58) Field of Classification Search
None
See application file for complete search history.

(56) References Cited

U.S. PATENT DOCUMENTS

| | | | | |
|---|---|---|---|---|
| 6,044,398 A | * | 3/2000 | Marullo ................ | G06F 16/958 709/219 |
| 6,741,967 B1 | * | 5/2004 | Wu ........................ | G06Q 30/02 705/1.1 |
| 6,976,210 B1 | | 12/2005 | Silva et al. | |
| 8,689,189 B1 | | 4/2014 | Cansizlar | |
| 8,924,934 B2 | | 12/2014 | Sullivan et al. | |
| 9,015,592 B2 | | 4/2015 | Gandhi et al. | |
| 9,465,593 B2 | * | 10/2016 | Fu ......................... | G06F 11/368 |
| 9,594,731 B2 | | 3/2017 | Zarzar et al. | |
| 10,261,893 B2 | * | 4/2019 | Forbes ................ | G06F 11/3692 |
| 10,496,527 B2 | * | 12/2019 | Stokes ................ | G06F 9/45533 |
| 2006/0085132 A1 | * | 4/2006 | Sharma ............... | G06F 11/3688 702/1 |
| 2006/0107121 A1 | * | 5/2006 | Mendrala ............ | G06F 11/3688 714/38.1 |

(Continued)

OTHER PUBLICATIONS

Mittal, Naina, and Ira Acharya. "An open framework for managed regression testing." IFIP International Conference on Testing of Software and Communicating Systems. Springer, Berlin, Heidelberg, 2003. (Year: 2003).*

(Continued)

*Primary Examiner* — Matthew J Brophy
(74) *Attorney, Agent, or Firm* — Michael A. Springs (57) ABSTRACT

An automated validation tool includes a hardware processor that receives a message that indicates a first element, a second element, and a third element of a first webpage. The message is generated in response to a detected change to source code for the first webpage. The processor determines that the first element and the second element exist on a second webpage and that the third element does not exist on the second webpage, that activating the first element on the second webpage performs a first function, and that activating the second element on the second webpage does not perform a second function. The second webpage represents the first webpage after the detected change is implemented. The processor communicates a response that indicates the determinations.

21 Claims, 3 Drawing Sheets

(56) References Cited

U.S. PATENT DOCUMENTS

| | | | | |
|---|---|---|---|---|
| 2011/0119220 A1* | 5/2011 | Seolas | ............... | G06F 17/2247 706/47 |
| 2011/0239104 A1* | 9/2011 | Prasad | ............... | G06F 11/3684 715/234 |
| 2012/0030651 A1* | 2/2012 | Kemmler | ............ | G06F 11/3688 717/124 |
| 2012/0131556 A1 | 5/2012 | Mathur et al. | | |
| 2012/0166480 A1 | 6/2012 | Mathur et al. | | |
| 2012/0174075 A1* | 7/2012 | Carteri | ............... | G06F 11/3688 717/127 |
| 2013/0004087 A1* | 1/2013 | Kumar | ............... | G06K 9/6202 382/218 |
| 2013/0159975 A1* | 6/2013 | Hu | ............... | G06F 16/972 717/124 |
| 2013/0219368 A1* | 8/2013 | Carteri | ............... | G06F 11/3688 717/126 |
| 2014/0082482 A1* | 3/2014 | Seolas | ............... | G06F 17/2247 715/234 |
| 2014/0105491 A1* | 4/2014 | Hayek | ............... | G06K 9/6202 382/165 |
| 2014/0147051 A1* | 5/2014 | Kumar | ............... | G06K 9/6202 382/206 |
| 2014/0317450 A1* | 10/2014 | Hess | ............... | G06F 11/3684 714/38.1 |
| 2016/0147645 A1* | 5/2016 | Kandpal | ............ | G06F 11/3672 717/124 |
| 2017/0046251 A1* | 2/2017 | Jafary | ............... | G06F 11/3684 |
| 2017/0091069 A1* | 3/2017 | Fujiwara | ............... | G06F 8/65 |
| 2017/0277625 A1* | 9/2017 | Shtuchkin | ............ | G06F 11/3688 |
| 2017/0337122 A1* | 11/2017 | Bolajwar | ............... | G06F 11/34 |
| 2018/0039565 A1* | 2/2018 | Rajagopalan | ....... | G06F 11/3676 |
| 2018/0075298 A1* | 3/2018 | Kumar | ............... | G06K 9/6202 |
| 2018/0157584 A1* | 6/2018 | Forbes | ............... | G06F 11/3692 |
| 2018/0329801 A1* | 11/2018 | McKee | ............... | G06F 11/0793 |
| 2018/0341573 A1* | 11/2018 | Patel | ............... | G06F 11/3664 |
| 2019/0034320 A1* | 1/2019 | Stokes | ............... | G06F 8/61 |

OTHER PUBLICATIONS

Alsmadi, Izzat, and Sascha Alda. "Test cases reduction and selection optimization in testing web services." International Journal of Information Engineering and Electronic Business 4.5 (2012): (Year: 2012).*

* cited by examiner

AUTOMATED VALIDATION TOOL

TECHNICAL FIELD

This disclosure relates generally to automated software tests.

BACKGROUND

Webpages are developed using source code. When this source code is changed, a series of automated tests is executed against the source code to determine if the change introduced any bugs or errors.

SUMMARY OF THE DISCLOSURE

Webpages are developed using source code. When source code is changed, a series of automated tests is executed against the source code to determine if the change introduced any bugs or errors. These tests are typically time and resource intensive. When these tests identify a bug or error, the tests are considered a failure. After appropriate corrections are made, the tests are run again to verify the corrections.

Sometimes, code changes alter surface level aspects of a webpage that can be quickly analyzed and verified (e.g., through automated browser). However, because these surface level changes are not checked until the automated tests are run, any unintended surface level changes will cause the automated tests to fail. As a result, surface level changes could result in a waste of time and resources.

This disclosure contemplates an automated validation tool that validates and/or verifies elements of a webpage when a code change occurs. The tool determines which elements are affected by the code change and then analyzes various aspects of these elements according to a particular set of rules. If a bug or error is detected in these elements, the tool communicates a response to a test server indicating the bugs and errors. In this manner, the test server does not need to execute the full suite of automated tests against the code change or the webpage to determine that the tests will fail. As a result, time and resources are saved. Three embodiments of the tool are described below.

According to an embodiment, an automated validation tool includes a memory and a hardware processor. The memory stores one or more validation rules. The hardware processor receives a message from a test server. The message indicates a first element, a second element, and a third element of a first webpage. The message is generated in response to a detected change to source code for the first webpage. The hardware processor determines, in accordance with the one or more validation rules, that the first element and the second element exist on a second webpage and that the third element does not exist on the second webpage. The second webpage represents the first webpage after the detected change is implemented. The hardware processor also determines, in accordance with the one or more validation rules, that activating the first element on the second webpage performs a first function indicated by the one or more validation rules and determines, in accordance with the one or more validation rules, that activating the second element on the second webpage does not perform a second function indicated by the one or more validation rules. The hardware processor further communicates a response to the test server. The response indicates that the first and second elements exist on the second webpage, that the third element does not exist on the second webpage, that activating the first element on the second webpage performs the first function, and that activating the second element on the second webpage does not perform the second function.

According to another embodiment, a method includes storing, by a memory, one or more validation rules and receiving, by a hardware processor communicatively coupled to the memory, a message from a test server. The message indicates a first element, a second element, and a third element of a first webpage. The message is generated in response to a detected change to source code for the first webpage. The method also includes determining, by the hardware processor, in accordance with the one or more validation rules, that the first element and the second element exist on a second webpage and that the third element does not exist on the second webpage. The second webpage represents the first webpage after the detected change is implemented. The method further includes determining, by the hardware processor, in accordance with the one or more validation rules, that activating the first element on the second webpage performs a first function indicated by the one or more validation rules and determining, by the hardware processor, in accordance with the one or more validation rules, that activating the second element on the second webpage does not perform a second function indicated by the one or more validation rules. The method also includes communicating, by the hardware processor, a response to the test server. The response indicates that the first and second elements exist on the second webpage, that the third element does not exist on the second webpage, that activating the first element on the second webpage performs the first function, and that activating the second element on the second webpage does not perform the second function.

According to yet another embodiment, a system includes a test server and an automated validation tool. The automated validation tool stores one or more validation rules and receives a message from the test server, the message indicating a first element, a second element, and a third element of a first webpage. The message is generated in response to a detected change to source code for the first webpage. The automated validation tool also determines, in accordance with the one or more validation rules, that the first element and the second element exist on a second webpage and that the third element does not exist on the second webpage. The second webpage represents the first webpage after the detected change is implemented. The automated validation tool further determines, in accordance with the one or more validation rules, that activating the first element on the second webpage performs a first function indicated by the one or more validation rules and determines, in accordance with the one or more validation rules, that activating the second element on the second webpage does not perform a second function indicated by the one or more validation rules. The automated validation tool also communicates a response to the test server. The response indicates that the first and second elements exist on the second webpage, that the third element does not exist on the second webpage, that activating the first element on the second webpage performs the first function, and that activating the second element on the second webpage does not perform the second function.

Certain embodiments provide one or more technical advantages. For example, an embodiment protects a test server from running a full suite of tests that will fail due to a surface level change on a webpage. As another example, an embodiment conserves time and system resources by determining that a test will fail without having to execute a full test suite. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
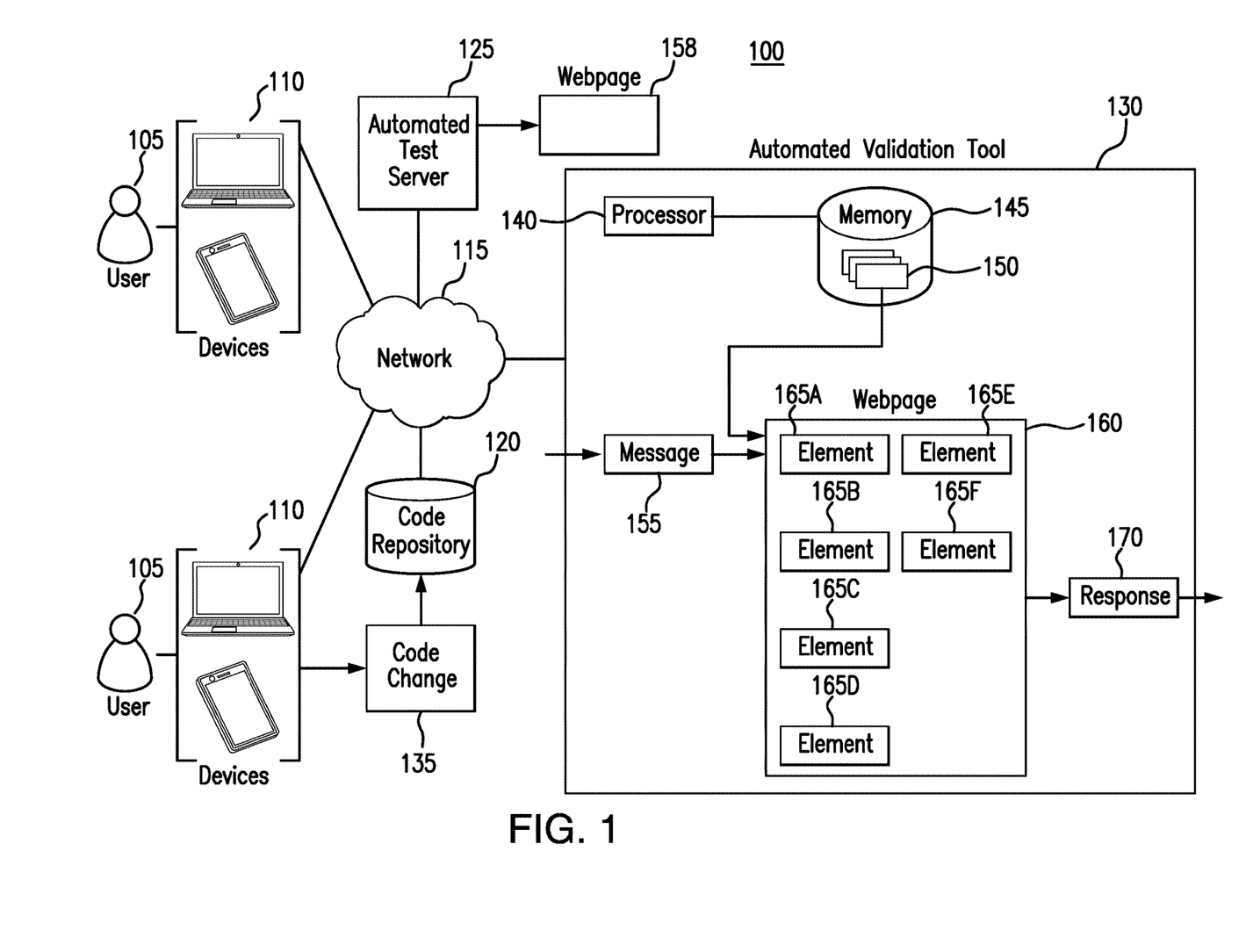
FIG. 1 illustrates a system for testing code changes.
Figure 2:
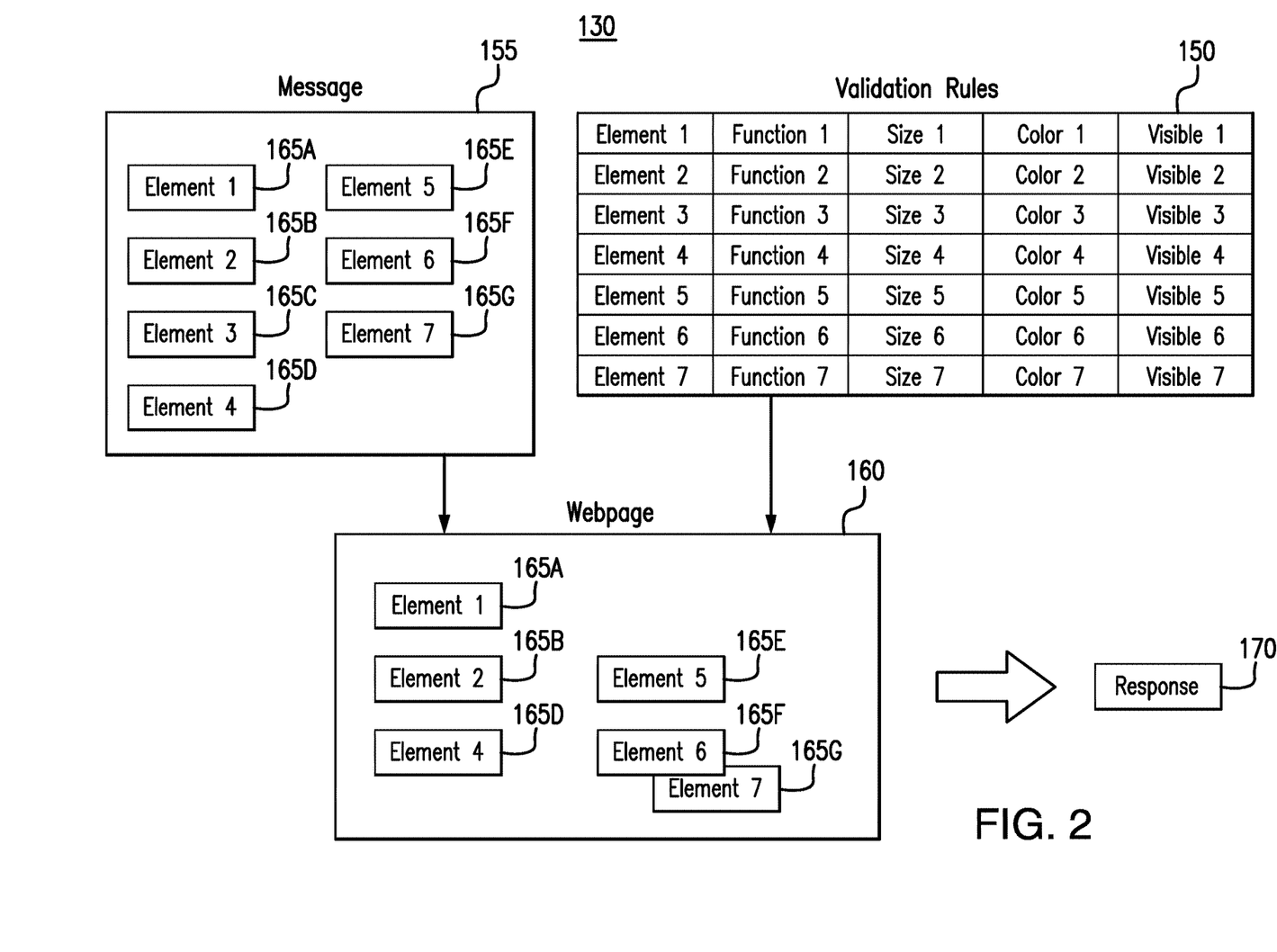
FIG. 2 illustrates an example automated validation tool of the system of FIG. 1.
Figure 3:
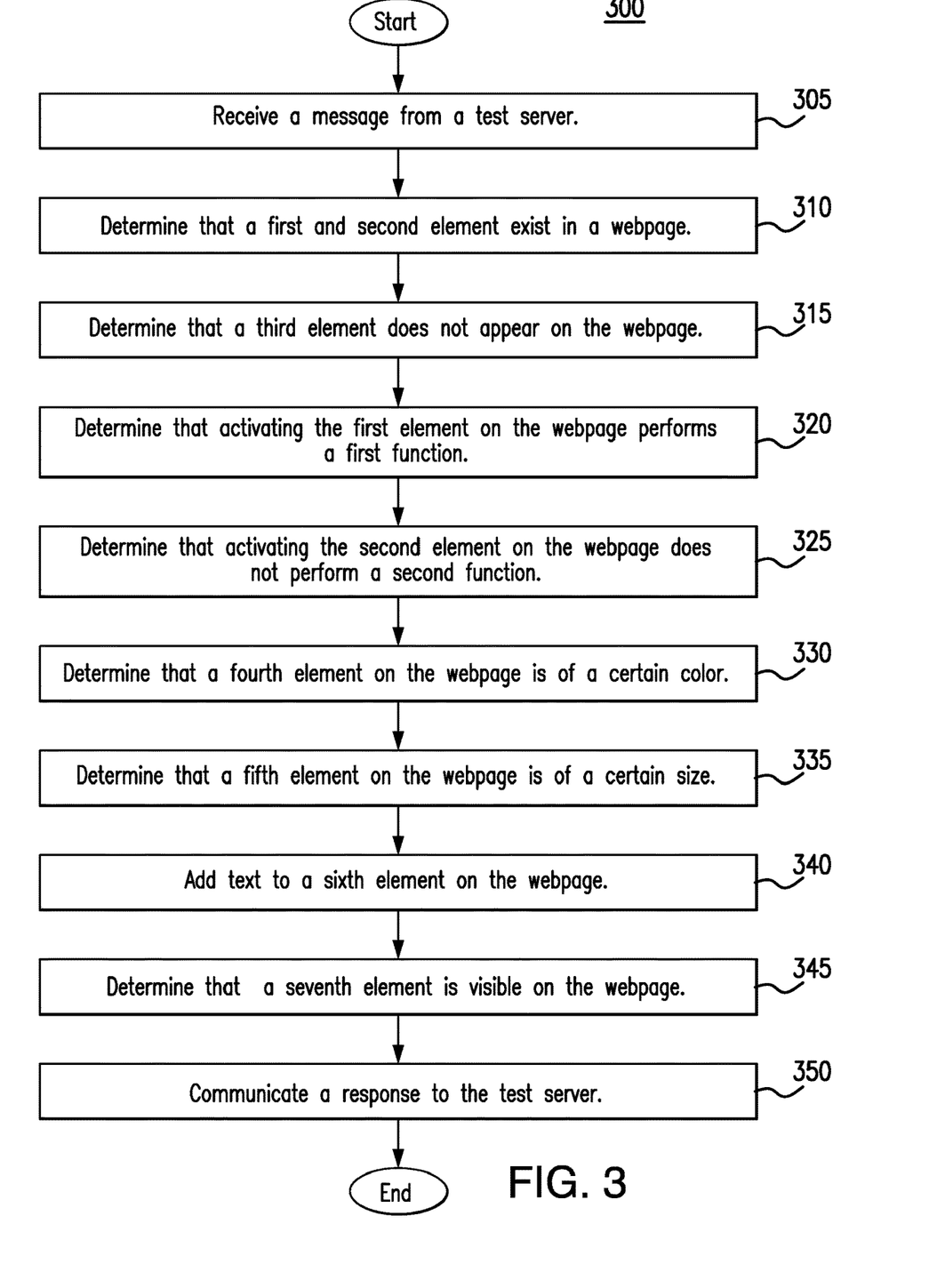
FIG. 3 is a flowchart illustrating a method for testing code changes using the system of FIG. 1.

Embodiments of the present disclosure and its advantages are best understood by referring to FIGS. 1 through 3 of the drawings, like numerals being used for like and corresponding parts of the various drawings.

Webpages are developed using source code. When source code is changed, a series of automated tests is executed against the source code to determine if the change introduced any bugs or errors. These tests are typically time and resource intensive. When these tests identify a bug or error, the tests are considered a failure. After appropriate corrections are made, the tests are run again to verify the corrections.

Sometimes, code changes alter surface level aspects of a webpage that can be quickly analyzed and verified. However, because these surface level changes are not checked until the automated tests are run, any unintended surface level changes will cause the automated tests to fail. As a result, surface level changes could result in a waste of time and resources.

This disclosure contemplates an automated validation tool that validates and/or verifies elements of a webpage when a code change occurs. The tool determines which elements are affected by the code change and then analyzes various aspects of these elements according to a set of rules. If a bug or error is detected in these elements, the tool communicates a response to a test server indicating the bugs and errors. In this manner, the test server does not need to execute the full suite of automated tests against the code change or the webpage to determine that the tests will fail. As a result, time and resources are saved. In certain embodiments, the automated validation tool protects a test server from running a full suite of tests that will fail due to a surface level change on a webpage. In this manner, the automated validation tool conserves time and system resources by determining that a test will fail without having to execute a full test suite. The automated validation tool will be described generally using FIG. 1. FIGS. 2 and 3 will describe the automated validation tool in more detail.

FIG. 1 illustrates a system 100 for testing code changes. As shown in FIG. 1, system 100 includes one or more devices 110, a network 115, a code repository 120, an automated test server 125, and an automated validation tool 130. In certain embodiments, system 100 conserves system resources by determining whether one or more code changes will fail a test executed by automated test server 125 without having automated test server 125 execute its full test suite.

Devices 110 include any device such as, for example, a desktop or laptop computer that receives and communicates code changes from user 105. In certain embodiments, the code changes are used to change a webpage or to change certain elements on a webpage. For example, the code changes can change the appearance or functionality of hyperlinks, buttons, textboxes, etc. on a webpage. Devices 110 communicates these code changes 135 to code repository 120.

Devices 110 may be any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Code repository 120 is a database that stores software code for one or more applications. For example, code repository 120 can store software code for one or more webpages. When a device 110 changes some software code, the device 110 communicates a code change 135 to code repository 120. Code change 135 reflects the change to the software code. Code repository 120 receives the code change and applies that code change to the stored software code. Code repository 120 can mark certain pieces of source code as changed and/or altered.

Automated test server 125 is a component that stores and executes an automated test suite against software code stored in code repository 120. The test suite includes one or more tests that, when executed, validate whether software code and/or source code stored in code repository 120 includes or causes bugs and/or errors. For example, software code for a webpage can define certain elements such as hyperlinks and buttons on the webpage. Automated test server 125 can execute a test against that source code to determine whether the hyperlinks direct a user to the correct location and whether a button performs an appropriate function when clicked or activated. If the elements of a webpage appear and function properly, then the test can be marked as a pass. Otherwise, the test is marked as a fail. The results of the test are reported back to user 105 so that user 105 can determine what changes should be made to the source code in code repository 120. For example, user 105 can determine that certain source code should be changed to repair a bug and/or an error.

Typically, automated tests are executed overnight because executing a full test suite takes a considerable amount of time and computing resources. Users 105 allow the test to run overnight and then return in the morning to see the results. In many instances, certain elements of a webpage can be easily validated and/or verified without having to execute a full suite of tests in automated test server 125. For example, the appearance and location of certain elements can be verified using an automated browser. In these instances, if a code change 135 causes one or more of these elements to change in appearance and/or size, then the automated browser can detect that change without having to execute a full suite of tests in automated test server 125. Because user 105 executes the full suite of tests in automated test server 125, however significant time and computing resources are expended needlessly.

Automated validation tool 130 can detect changes to elements on a webpage caused by a code change 135 without needing to execute the full suite of tests administered by automated test server 125. In this manner, automated validation tool 130 conserves time and computing resources by determining when a test of an automated test server 125 will fail without having to execute the full test stored in automated test server 125. As shown in FIG. 1, automated validation tool 130 includes a processor 140 and a memory 145. This disclosure contemplates processor 140 and memory 145 being configured to perform any of the functions of automated validation tool 130 described herein.

Processor 140 is any electronic circuitry, including, but not limited to microprocessors, application specific integrated circuits (ASIC), application specific instruction set processor (ASIP), and/or state machines, that communicatively couples to memory 145 and controls the operation of automated validation tool 130. Processor 140 may be 8-bit, 16-bit, 32-bit, 64-bit or of any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory to perform any of the functions described herein. Processor 140 controls the operation and administration of automated validation tool 130 by processing information received from network 115, device(s) 110, and memory 145. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 140. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Generally, automated validation tool determines when a code change 135 has been made and sent to code repository 120. Automated validation tool then determines the elements of a webpage that are affected by code change 135. Automated validation tool 130 then determines whether certain aspects of these elements are altered which would cause a test of automated test server 125 to fail. Automated validation tool 130 then communicates the results of its analysis to automated test server 125. If automated validation tool 130 determines that the test will fail, automated test server 125 can alert a user 105 that submitted code change 135. In this manner, automated test server 125 does not have to execute a full suite of tests before alerting user 105 that code change 135 will fail the test. The operation of automated validation tool 130 will be described in more detail using FIGS. 1 through 3.

Automated validation tool 130 stores one or more validation rules in memory 145. Validation rules 150 indicate how one or more elements of a webpage should appear and/or function. When a code change 135 is made, automated validation tool 130 uses validation rules 150 to determine whether the code change 135 alters an element of a webpage in such a manner that the resulting element defers from how validation rules 150 indicate that the element should appear and/or function. An example set of validation rules 150 will be discussed using FIG. 2.

Automated validation tool 130 receives a message 155 when code change 135 is made. Message 155 is generated in response to code change 135 being detected at code repository 120 or by automated test server 125. In some embodiments, automated test server 125 communicates message 155 to automated validation tool 130 when automated test server 125 detects code change 135 has been made. When automated test server 125 determines that code change 135 is made, automated test server 125 determines a webpage 158 that is changed by code change 135. Automated test server 125 then analyzes the webpage 158 to determine the one or more elements of webpage 158. Automated test server 125 then communicates message 155 to automated validation tool 130. Message 155 indicates the one or more elements of webpage 158 that may be affected by code change 135. Automated validation tool 130 then validates whether those elements of webpage 158 are altered in such a manner that they will fail a test administered by automated test server 125. In particular embodiments, message 155 is generated as a JavaScript Object Notation message. This disclosure contemplates message 155 being generated in any suitable format.

After automated validation tool 130 receives message 155, automated validation tool 130 generates a webpage 160. Webpage 160 represents webpage 158 after code change 135 has been applied. Webpage 160 includes the one or more elements of webpage 158. Automated validation tool 130 verifies whether these one or more elements are altered in such a way that they will fail a test administered by automated test server 125. In the illustrated example of FIG. 1, automated validation tool 130 generates a webpage 160 that includes a first element 165A, a second element 165B, a third element 165C, a fourth element 165D, a fifth element 165E and a sixth element 165F. This disclosure contemplates webpage 160 including any number of elements 165.

Automated validation tool 130 then verifies whether these six elements 165 are altered in such a way that they will fail a test administered by automated test server 125. Automated validation tool 130 analyzes each element 165 in accordance with one or more validation rules 150. For example, automated validation tool 130 can validate one or more of the location, color, size, and function of an element 165 of webpage 160 in accordance with validation rules 150.

If automated validation tool 130 determines that the elements 165 are not altered in such a way that they will fail a test administered by automated test server 125, then automated validation tool 130 communicates a response 170 to automated test server 125 that indicates that the code change 135 or tests are a pass. In response, automated test server 125 can then execute the full suite of tests against the code change 135. If automated validation tool 130 determines that one or more elements 165 are altered in such a manner that a test of automated test server 125 will fail, automated validation tool 130 communicates response 170 indicating that the test will fail. In response, automated test server 125 alerts a user 105 that code change 135 will fail a test. In this manner, user 105 is alerted of the failure and can make appropriate changes without having to execute the full suite of tests of automated test server 125 thus conserving time and computing resources. The operation of automated validation tool 130 will be described in more detail using FIGS. 2 and 3.

FIG. 2 illustrates an example automated validation tool 130 of the system 100 of FIG. 1. In certain embodiments, automated validation tool 130 conserves time and computing resources by determining whether certain elements of a webpage are altered in such a manner that they would fail a test executed or administered by an automated test server. In this manner, the automated test server does not have to execute its full suite of tests for the failure to be detected.

As shown in FIG. 2, automated validation tool 130 receives a message 155. Message 155 is generated in response to a detected code change. For example, automated test server can detect that a code change has been sent to a code repository. The automated test server can determine the webpages and/or the elements of these webpages that are potentially affected by the code change. The automated test server then communicates message 155 to the automated validation tool 130. In the example of FIG. 2, message 155 indicates that seven elements 165 are potentially affected by a code change. Message 155 indicates that element1 165A, element2 165B, element3 165C, element4 165D, element5 165E, element6 165F, and element1 165G are potentially affected by a code change.

Automated validation tool 130 also stores validation rules 150. Validation rules 150 indicate the appearance and/or function of various elements. In the example of FIG. 2, validation rules 150 indicate the appearance and function of the seven elements. According to validation rules 150, element1 performs function1 and has a size1, color1, and visibility1. Element2 performs function2 and has a size2, color2, and visibility2. Element3 performs function3 and has a size3, color3, and visibility3. Element4 performs function4 and has a size4, color4, and visibility4. Element5 performs function5 and has a size5, color5, and visibility5. Element6 performs function6 and has a size6, color6, and visibility6. Element7 performs function7 and has a size7, color7, and visibility7. This disclosure contemplates validation rules 150 indicating that any element can perform any suitable function and has any suitable size, color, or visibility. Additionally, this disclosure contemplates any element performing any function and having any size, color, or visibility. Automated validation tool 130 analyzes each element indicated by message 155 according to validation rules 150 to determine whether these elements are altered in such a manner that they will cause a failure to occur.

Automated validation tool 130 generates a webpage 160. Webpage 160 represents a base webpage that has implemented a detected code change. The base webpage may include each of the elements 165 indicated by message 155. After the code change, these elements may be altered. Webpage 160 will show these alterations.

In the example of FIG. 2, webpage 160 includes element1 165A, element2 165B, element4 165D, element5 165E, element6 165F, and element1 165G. Each of these elements 165 may be any suitable element of a webpage such as, for example, a hyperlink, a button, a textbox, a picture, etc. Automated validation tool 130 will examine and determine whether each of these elements 165 appears and/or behaves according to validation rules 150.

Automated validation tool 130 determines that element1 165A appears on webpage 160. Validation rules 150 then determines whether element1 165A has a size1, color1, and visibility1 as indicated by validation rules 150. Automated validation tool 130 also activates element1 165A to see if it performs function1 as indicated by validation rules 150. If element1 165A does not perform function1 when activated or does not have a size1, color1 or visibility1, then automated validation tool 130 indicates in response 170 that element1 would fail a test administered by the automated test server. If element1 165A performs function1 when activated and has size1, color1 and visibility1, validation rules 150 indicates in response 170 that element1 165A would pass a test administered by the automated test server.

For example, element1 165A may be a button. Validation rules 160 may determine that the button has a particular size indicated by validation rules 150, is gray as indicated by color1, and is visible on webpage 160 as indicated by visibility1. Automated validation tool 130 can also click and/or activate the button to determine that it performs a function1 indicated by validation rules 150. For example, automated validation tool 130 can determine that activating the button communicates information to a subsequent webpage.

Automated validation tool 130 determines that element2 165B appears on webpage 160. Similar to element1 165A, automated validated tool 130 determines whether element2 165B performs function2 when activated and whether element2 165B has a size2, color2 and visibility2 in accordance with validation rules 150. Automated validation tool 130 indicates in response 170 whether element2 165B performs function2 and has size2, color2, and visibility2. For example, element2 can be a hyperlink and automated validation tool 130 can determine whether element2 directs to the appropriate website when clicked and whether element2 is of a certain length and color when activated and not activated and whether element2 is visible on webpage 160. Automated validation tool 130 indicates in response 170 whether element2 performs function2 when activated and whether element2 appears on webpage 160 and has size2, color2, and visibility2.

Automated validation tool 130 can determine that element3 165C does not appear on webpage 160. As a result, automated validation tool 130 can determine that the code change removed element3 165C because validation rules 150 indicate that element3 should appear on webpage 160. Automated validation tool 130 can indicate in response 170 that element3 165C does not appear on webpage 160.

Automated validation tool 130 can determine that element4 is on webpage 160. Automated validation tool 130 can determine whether element4 165D performs a function4 when activated and has a size4, color4 and visibility4. For example, element4 can be a picture or a button. Automated validation tool 130 can determine whether the picture or the button matches a color indicated by validation rules 150. For example, if color4 is red, automated validation tool 130 can determine whether element4 165D is red. Automated validation tool 130 indicates in response 170 whether element4 165D is of a color indicated by validation rules 150 such as, for example, red.

Automated validation tool 130 determines that element5 165E is on webpage 160. Automated validation tool 130 can determine whether element5 165E performs a function5 when activated and has a size5, color5, and visibility5. For example, element5 can be a button or a picture or a hyperlink. Automated validation tool 130 can determine whether element5 165E is of a particular size indicated by validation rules 150. If size5 indicates a length or a set of dimensions, automated validation tool 130 determines whether element5 165E is of that size or of those dimensions. Automated validation tool 130 indicates in response 170 whether element5 165E is of size5.

Automated validation tool 130 determines that element6 165F appears on webpage 160. Automated validation tool 130 determines whether element6 performs a function6 when activated and has a size6, color6, and visibility6. If element6 is a textbox, automated validation tool 130 can enter text into that textbox to determine whether the text appears in the textbox. Validation rules 150 may indicate that function6 is to enter a particular set of text and for that text to appear, automated validation tool 130 indicates in response 170 whether the entered text appeared in element6 165F in accordance with validation rules 150.

Automated validation tool 130 determines that element7 165G appears on webpage 160. Automated validation tool 130 then determines whether element7 165G performs function7 when activated, has a size7, color7 and visibility7. In the example of FIG. 2, element7 165G is partially blocked or obscured by element6 165F. Automated validation tool 130 determines whether this partial visibility is in accordance with visibility7 indicated by validation rules 150. Automated validation tool 130 indicates in response 170 whether element7 165G has visibility7 even though it is partially obscured by element6 165F.

Automated validation tool 130 communicates response 170 to the automated test server to alert the automated test server as to which elements would pass or fail a test administered by the automated test server. In this example, response 170 indicates that element1, element2, element4, element5, element6, and element7 appear on webpage 160. Response 170 may indicate that element3 does not appear on webpage 160. Response 170 also indicates that element1 performs function1 when activated and that element2 does not perform function2 when activated. Additionally, response 170 indicates that element4 is of a color4, that element5 is of a size5, that element6 is a textbox that allows text entry, and that element7 has a visibility7. The automated test server then communicates those results to a user who made the code change. In this manner, the user is alerted as to whether any tests would fail without needing to execute the full suite of tests of the automated test server thus conserving time and computing resources.

FIG. 3 is a flowchart showing a method 300 for testing code changes using the system 100 of FIG. 1. In particular embodiments, automated validation tool 130 performs method 300. By performing 300, automated validation tool 130 reduces time and competing resources consumed by validating whether certain elements of a webpage are altered by a code change in such a manner that they would fail a test administered by an automated test server without having to execute a full test suite of the automated test server.

Automated validation tool 130 begins by receiving a message from a test server. In step 305, the message indicates one or more elements of a webpage that are affected by a detected code change. The message is generated in response to the detection of the code change.

Automated validation tool 130 then determines that a first and second element exists on a webpage in step 310. The first and second element are indicated by the received message. The webpage represents a base webpage that has been altered by the detected code change. In step 315, automated validation tool 130 determines that a third element does not appear on the webpage. The third element may have been removed by the code change.

Automated validation tool 130 determines that activating the first element on the webpage performs a first function in step 320. For example, the first element may be a button and the function may be to communicate information to a subsequent webpage. The automated validation tool 130 determines whether activating or clicking the button initiates the communication of the information to the subsequent webpage.

In step 325, automated validation tool 130 determines that activating the second element on the webpage does not perform a second function. For example, the second element may be a hyperlink. When that hyperlink is activated it should direct to a subsequent webpage. Automated validation tool 130 can determine that activating the hyperlink does not direct to the appropriate webpage.

In step 330, automated validation tool 130 determines that a fourth element on the webpage is of a certain color. For example, the fourth element may be a button. Automated validation tool 130 can determine whether the button is of an appropriate color such as, for example, gray or white.

Automated validation tool 130 then determines that a fifth element on the webpage is of a certain size in step 335. For example, the fifth element may be a picture or graphic. Automated validation tool 130 determines whether the picture or the graphic is of the appropriate dimensions.

Automated validation tool 130 then adds text to a sixth element on the webpage in step 340. For example, the sixth element may be a textbox. Automated validation tool 130 may add text to the textbox to determine whether that text appears.

In step 345, automated validation tool 130 determines that a seventh element is visible on the webpage. For example, the seventh element may be partially blocked or obscured by another element on the webpage. Automated validation tool 130 determines whether that level of visibility is appropriate for the seventh element.

In step 350, automated validation tool 130 communicates the response to the test server. The response indicates whether each of the elements on the webpage have been altered in such a manner that a test of the test server may fail. If the response indicates that a test would fail, the test server can alert the user that the detected code change would cause a test to fail. In this manner, the user can be made aware of the impending failure without having to execute the full suite of tests administered by the test server, thus saving time and computing resources that would have been wasted had the full suite of tests been administered.

Modifications, additions, or omissions may be made to method 300 depicted in FIG. 3. Method 300 may include more, fewer, or other steps. For example, steps may be performed in parallel or in any suitable order. While discussed as automated validation tool 130 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An automated validation tool comprising:
a memory configured to store one or more validation rules; and
a hardware processor communicatively coupled to the memory, the hardware processor configured to:
receive a message from a test server, the message indicating a first element, a second element, a third element, a fourth element, a fifth element, a sixth element, and a seventh element of a first webpage, the message generated in response to a detected change to source code for the first webpage, wherein the test server determined that the first element, the second element, the third element, the fourth element, the fifth element, the sixth element, and the seventh element may be affected by the detected change before executing a test against the source code;
in response to receiving the message, generate a second webpage representing the first webpage after the detected change to the source code is implemented;
determine, in accordance with the one or more validation rules, that the first element and the second element exist on the second webpage and that the third element does not exist on the second webpage;
determine, in accordance with the one or more validation rules, that activating the first element on the second webpage performs a first function indicated by the one or more validation rules;
determine, in accordance with the one or more validation rules, that activating the second element on the second webpage does not perform a second function indicated by the one or more validation rules;
determine, in accordance with the one or more validation rules, that the sixth element partially obscures the seventh element on the second webpage;
in response to determining that the first and second elements exist on the second webpage, that the third element does not exist on the second webpage, that activating the first element on the second webpage performs the first function, that activating the second element on the second webpage does not perform the second function, and that the sixth element partially obscures the seventh element on the second webpage, determine that the test will fail if the test is executed against the source code after the detected changes are implemented; and
communicate a response to the test server, the response indicating that the first and second elements exist on the second webpage, that the third element does not exist on the second webpage, that activating the first element on the second webpage performs the first function, that activating the second element on the second webpage does not perform the second function, and that the sixth element partially obscures the seventh element on the second webpage, wherein the test server communicates an alert to a user in response to receiving the response, the alert indicating that the detected change will fail the test, wherein in response to the alert, the test server does not execute the test against the source code.

2. The automated validation tool of claim 1, wherein the hardware processor is further configured to determine, in accordance with the one or more validation rules, that the fourth element on the second webpage is of a color indicated by the one or more validation rules, the response further indicating that the fourth element is of the color.

3. The automated validation tool of claim 1, wherein the hardware processor is further configured to determine, in accordance with the one or more validation rules, that the fifth element on the second webpage is of a size indicated by the one or more validation rule, the response further indicating that the fifth element is of the size.

4. The automated validation tool of claim 1, wherein the hardware processor is further configured to add, in accordance with the one or more validation rules, text to the sixth element on the second webpage, the response further indicating that the text was added to the sixth element.

5. The automated validation tool of claim 1, wherein the hardware processor is further configured to determine that the seventh element on the second webpage is visible, the response further indicating the seventh element is visible on the second webpage.

6. The automated validation tool of claim 1, wherein the message and the response are written in JavaScript Object Notation.

7. The automated validation tool of claim 1, wherein the test server is an automated test server.

8. A method comprising:
storing, by a memory, one or more validation rules;
receiving, by a hardware processor communicatively coupled to the memory, a message from a test server, the message indicating a first element, a second element, a third element, a fourth element, a fifth element, a sixth element, and a seventh element of a first webpage, the message generated in response to a detected change to source code for the first webpage, wherein the test server determined that the first element, the second element, the third element, the fourth element, the fifth element, the sixth element, and the seventh element may be affected by the detected change before executing a test against the source code;
in response to receiving the message, generating a second webpage representing the first webpage after the detected change to the source code is implemented;
determining, by the hardware processor, in accordance with the one or more validation rules, that the first element and the second element exist on the second webpage and that the third element does not exist on the second webpage;
determining, by the hardware processor, in accordance with the one or more validation rules, that activating the first element on the second webpage performs a first function indicated by the one or more validation rules;
determining, by the hardware processor, in accordance with the one or more validation rules, that activating the second element on the second webpage does not perform a second function indicated by the one or more validation rules;

determining, in accordance with the one or more validation rules, that the sixth element partially obscures the seventh element on the second webpage;

in response to determining that the first and second elements exist on the second webpage, that the third element does not exist on the second webpage, that activating the first element on the second webpage performs the first function, that activating the second element on the second webpage does not perform the second function, and that the sixth element partially obscures the seventh element on the second webpage, determining that the test will fail if the test is executed against the source code after the detected changes are implemented; and communicating, by the hardware processor, a response to the test server, the response indicating that the first and second elements exist on the second webpage, that the third element does not exist on the second webpage, that activating the first element on the second webpage performs the first function, that activating the second element on the second webpage does not perform the second function, and that the sixth element partially obscures the seventh element on the second webpage, wherein the test server communicates an alert to a user in response to receiving the response, the alert indicating that the detected change will fail the test, wherein in response to the alert, the test server does not execute the test against the source code.

9. The method of claim 8, further comprising determining, by the hardware processor, in accordance with the one or more validation rules, that the fourth element on the second webpage is of a color indicated by the one or more validation rules, the response further indicating that the fourth element is of the color.

10. The method of claim 8, further comprising determining, by the hardware processor, in accordance with the one or more validation rules, that the fifth element on the second webpage is of a size indicated by the one or more validation rule, the response further indicating that the fifth element is of the size.

11. The method of claim 8, further comprising adding, by the hardware processor, in accordance with the one or more validation rules, text to the sixth element on the second webpage, the response further indicating that the text was added to the sixth element.

12. The method of claim 8, further comprising determining, by the hardware processor, that the seventh element on the second webpage is visible, the response further indicating the seventh element is visible on the second webpage.

13. The method of claim 8, wherein the message and the response are written in JavaScript Object Notation.

14. The method of claim 8, wherein the test server is an automated test server.

15. A system comprising:
a test server; and
an automated validation tool comprising a hardware processor, the hardware processor configured to:
store one or more validation rules;
receive a message from the test server, the message indicating a first element, a second element, a third element, a fourth element, a fifth element, a sixth element, and a seventh element of a first webpage, the message generated in response to a detected change to source code for the first webpage, wherein the test server determined that the first element, the second element, the third element, the fourth element, the fifth element, the sixth element, and the seventh element may be affected by the detected change before executing a test against the source code;

in response to receiving the message, generate a second webpage representing the first webpage after the detected change to the source code is implemented;

determine, in accordance with the one or more validation rules, that the first element and the second element exist on the second webpage and that the third element does not exist on the second webpage;

determine, in accordance with the one or more validation rules, that activating the first element on the second webpage performs a first function indicated by the one or more validation rules;

determine, in accordance with the one or more validation rules, that activating the second element on the second webpage does not perform a second function indicated by the one or more validation rules;

determine, in accordance with the one or more validation rules, that the sixth element partially obscures the seventh element on the second webpage;

in response to determining that the first and second elements exist on the second webpage, that the third element does not exist on the second webpage, that activating the first element on the second webpage performs the first function, that activating the second element on the second webpage does not perform the second function, and that the sixth element partially obscures the seventh element on the second webpage, determine that the test will fail if the test is executed against the source code after the detected changes are implemented; and communicate a response to the test server, the response indicating that the first and second elements exist on the second webpage, that the third element does not exist on the second webpage, that activating the first element on the second webpage performs the first function, and that activating the second element on the second webpage does not perform the second function, and that the sixth element partially obscures the seventh element on the second webpage, wherein the test server communicates an alert to a user in response to receiving the response, the alert indicating that the detected change will fail the test, wherein in response to the alert, the test server does not execute the test against the source code.

16. The system of claim 15, wherein the hardware processor is further configured to determine, in accordance with the one or more validation rules, that the fourth element on the second webpage is of a color indicated by the one or more validation rules, the response further indicating that the fourth element is of the color.

17. The system of claim 15, wherein the hardware processor is further configured to determine, in accordance with the one or more validation rules, that the fifth element on the second webpage is of a size indicated by the one or more validation rule, the response further indicating that the fifth element is of the size.

18. The system of claim 15, wherein the hardware processor is further configured to add, in accordance with the one or more validation rules, text to the sixth element on the second webpage, the response further indicating that the text was added to the sixth element.

19. The system of claim 15, wherein the hardware processor is further configured to determine that the seventh element on the second webpage is visible, the response further indicating the seventh element is visible on the second webpage.

20. The system of claim 15, wherein the message and the response are written in JavaScript Object Notation.

21. The system of claim 15, wherein the test server is an automated test server.

\* \* \* \* \*